United States Patent [19]

Gönner

[11] Patent Number: 5,291,927
[45] Date of Patent: Mar. 8, 1994

[54] DEVICE FOR TRUING PLANKS

[75] Inventor: Siegmar Gönner, Oberkirch, Fed. Rep. of Germany

[73] Assignee: Gebrüder Linck Maschinenfabrik "Gatterlinck" GmbH & Co. KG, Oberkirch, Fed. Rep. of Germany

[21] Appl. No.: 920,500
[22] PCT Filed: Dec. 19, 1990
[86] PCT No.: PCT/EP90/02266
§ 371 Date: Aug. 21, 1992
§ 102(e) Date: Aug. 21, 1992
[87] PCT Pub. No.: WO91/16183
PCT Pub. Date: Oct. 31, 1991

[30] Foreign Application Priority Data

Apr. 20, 1990 [DE] Fed. Rep. of Germany ....... 4012645

[51] Int. Cl.⁵ .............................. B27H 1/00
[52] U.S. Cl. ................. 144/256.1; 100/299; 144/2 R; 144/361; 144/381
[58] Field of Search ............... 156/209, 220; 100/155 R, 160, 176, 299; 144/2 R, 255, 332, 355, 446 R, 356, 361, 362, 256.1, 381

[56] References Cited

U.S. PATENT DOCUMENTS 4,977,940 12/1990 Gonner et al. ............... 144/2 R

FOREIGN PATENT DOCUMENTS 375866 9/1984 Austria .
0211810 2/1987 European Pat. Off. .
640636 7/1928 France .

Primary Examiner—W. Donald Bray
Attorney, Agent, or Firm—Burns, Doane, Swecker & Mathis

[57] ABSTRACT

An apparatus for truing twisted wooden boards by twisting them in an opposite direction, comprises an upper set of parallel plates and a lower set of parallel plates. A channel is formed between opposing edges of the upper and lower plates. The upper plates are pivotable about an upper pivot axis, and the lower plates are pivotable about a lower axis. Those axes are oriented transversely relative to a longitudinal axis of the channel and are situated at an inlet end of the channel. A pivoting mechanism causes the plates to be displaced vertically relative to one another to twist the channel about its longitudinal axis.

11 Claims, 5 Drawing Sheets

DEVICE FOR TRUING PLANKS

BACKGROUND OF THE INVENTION

The invention concerns a process for the rotary truing of boards and similar elongated wood products by means of a plurality of adjustably supported guide bodies, which together form a flat board guide channel extending along the longitudinal axis of the frame and having a twist around the longitudinal axis of the frame, said twist being variable by the adjustment of the guide bodies.

Boards and similar plate like elongated wood products may be cut by chipless cutting methods from the sides of flattened logs or tree trunks. These boards or similar wood products have not only curvatures, but also twists, i.e. they are turned or twisted around their longitudinal axis. In numerous applications, this deformation prevents any automatic further processing of the boards. The intensity of the twist increases with the inclination at which the blades cutting the board are set against the longitudinal direction of the wood.

By means of a known apparatus of the aforementioned type (for example, Gönner et al U.S. Pat. No. 4,977,940) the boards may be subjected to a rotary straightening process, so that they lose their twist due to the manufacturing process and become suitable for further processing.

In the case of this known apparatus in a plurality of successive guide stands, rollers are provided as the board guide bodies. The guide stands are pivoted around a common axis, for example the longitudinal axis of the frame, in a manner such that together they form a board guide channel, the twist around the longitudinally axis whereof is chosen so that it straightens the existing twist of the boards.

As the twist of the boards varies depending on the manufacturing conditions, the type of wood and its properties, the guide stands of the known apparatus are individually equipped with separate pivot drives to move them into the pivoting position required. The control of these individual pivot drives is relatively expensive. In addition, the necessary design effort is relatively high.

In a known apparatus for example, Hobbs U.S. Pat. No. 2,399,348 for the bending of laminated work pieces to be glued together, a plurality of parallel bending stops may be moved against the work piece in order to press it against a group of stationary stops. However, the work piece is not twisted in the process, but bent. Furthermore, the work piece does not travel in a guide channel, but is inserted between the two groups of bending stops prior to their displacement.

It is therefore the object of the present invention to develop an apparatus of the aforementioned generic type so that it is very sturdy while having a simple design configuration; said apparatus making possible the adjustment of the board guide channel.

SUMMARY OF THE INVENTION

This object is attained according to the invention by that the guide bodies are guide plates extending in the longitudinal direction of the frame and arranged in two sets of plates, which form with their plate edges facing each other the board guide channel, and that the guide plates of each set of plates may be pivoted around a common plate pivoting axle extending near the inlet of the board guide channel, transversely to the guide plates, separately by means of a pivot drive.

The guide plates of each of the sets of plates may thus be adjusted in a fan like manner relative to each other, so that the board guide channel formed between the two sets of plates may alter its twist, beginning from the inlet which remains unchanged. The twist is altered by rotating the boards passing through the board guide channel in its longitudinal direction against the twist they had received in the course of their production, so that this original twist of the boards is lost and the boards are straightened.

To alter the twist of the board guide channel it is sufficient to change the fan like spread of the guide plates of each set of plates by pivoting the individual guide plates differently. It is obvious that this pivoting adjustment of the individual guide plates is carried out so that the board guide channel formed between the set of plates approximately retains its width in all of its locations, so that the boards are able to pass through the board guide channel, while retaining adequate guidance to carry out the rotary straightening process. The design configuration of the apparatus is very simple, as only the guide plates are moving parts, aside from the pivoting drives. These guide plates may be in the form of highly stable parts, which by their flat abutment against each other in the set, guide and support each other, so that aside from the pivot bearings of a very simple configuration, no other guidance of the guide plates is required. This makes a compact layout of the rotary straightening apparatus possible, so that it may be located at a short distance after the processing station in which the boards are produced by a chipless method.

Preferably, all of the guide plates of each of the set of plates are connected with a common pivot drive in a manner such that the individual guide plates may be pivoted differently and spread in the shape of a fan. This significantly reduces the design effort for the pivot drive. However, a separate pivot drive may also be provided for each of the guide plates.

An especially simple and robust form of embodiment of the pivot drive is characterized in that the pivot drive comprises adjusting rods extending through bore holes transversely to the guide plates, said rods being capable of tilting around axles located parallel to the longitudinal axis of the frame. By means of a tilting motion of said adjusting rods all of the guide plates of the associated set of plates are pivoted together, but at different pivot angles.

BRIEF DESCRIPTION OF THE DRAWINGS

In the following, an example of embodiment of the invention is explained in more detail with reference to the drawing, wherein.

DETAILED DESCRIPTION OF A PREFERRED EMBODIMENT OF THE INVENTION

Figure 1:
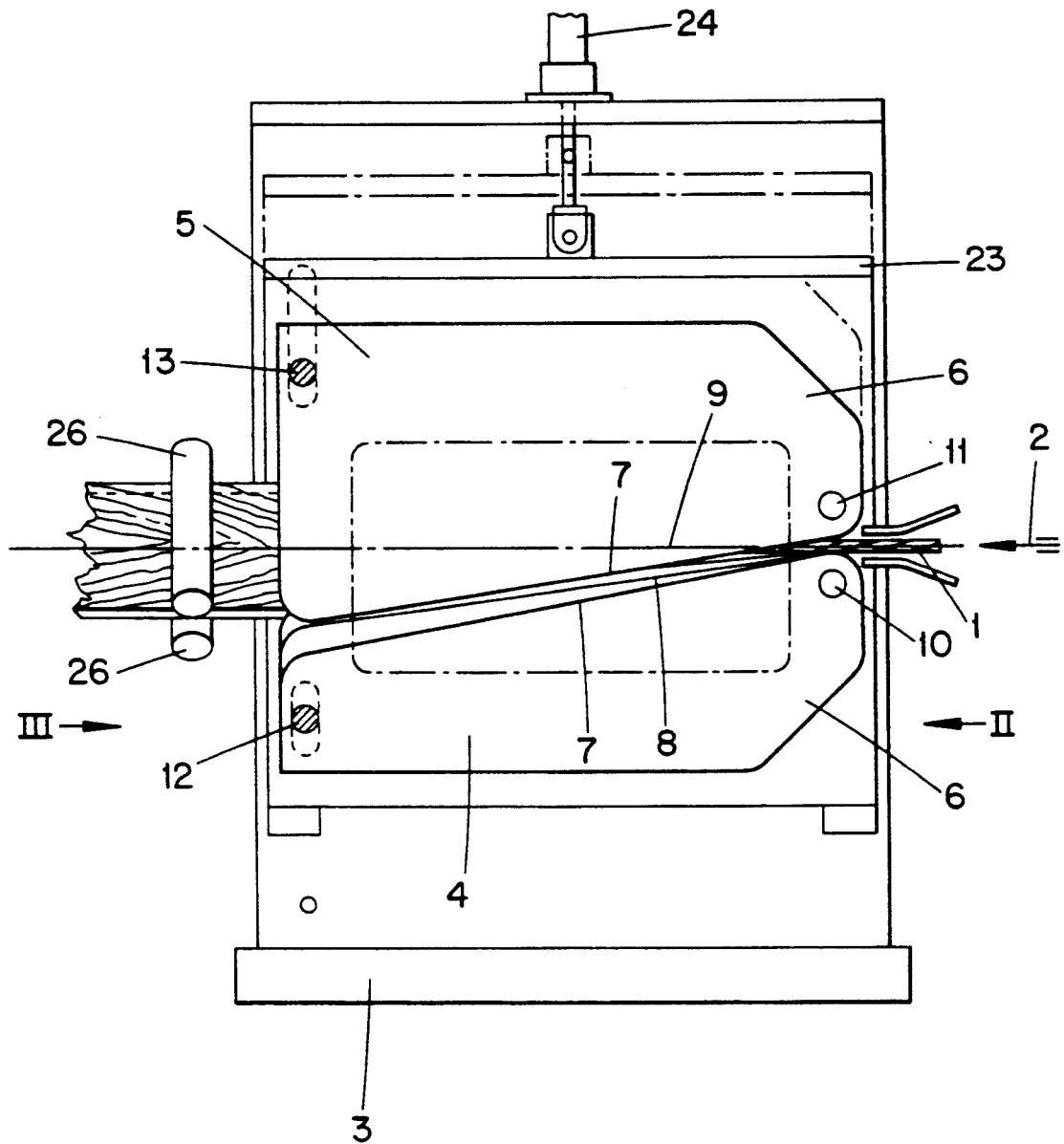
FIG. 1 is a simplified lateral elevation of an apparatus for the rotary straightening of boards, FIG. 2 a front elevation of the apparatus according to FIG. 1 in the direction of the arrow II, FIG. 3 a front elevation of the apparatus according to FIG. 1 in the direction of the arrows III.

The apparatus shown in the drawing is used in the rotary straightening of boards and similar elongated, flat wood products, cut by chipless methods from the sides of a flattened log or tree trunk. These wood products, designated hereinafter in a simplified manner as "boards 1", enter from the inlet side located to the right in FIG. 1 in the direction of the arrow 2 and leave the apparatus at the outlet end (left in FIG. 1).

The apparatus comprises a frame 3, in which a lower set of plates 4 and an upper set of plates 5 are located above each other. Each of the sets of plates 4, 5 consists of flat guide plates 6 standing on edge.

The guide plates 6 extend in the longitudinal direction of the frame and form between opposing edges 7a a board guide channel 8, which extends in the longitudinal direction of the frame and includes a twist around the longitudinal axis of the frame. This twist of the board guide channel 8 opposes the natural twist of the boards around their longitudinal axis, generated in the course of the cutting process. Consequently, the boards are subjected during their passage through the board guide channel to a rotary truing process, which straightens them.

The plate edges 7 bordering the board guide channel 8 are—viewed in planes normal to the frame axis 9 (see FIG. 2)—rounded, so that no sharp edges capable of damaging the boards 1, are projecting into the board guide channel 8. As seen particularly in FIGS. 1-3, even in the initial state shown, the plate edges 7 are more or less inclined relative to a horizontal plane so that the board guide channel 8 even in the initial state shown has a predetermined twist. In other words, the guide plates 6 of each set of plates 4, 5 are spread in the area of their longitudinal edges 7 in a fan like fashion, so that the board guide channel 8 is thereby given its twist, wherein the term "twist" is intended to signify a helical variation of the board guide channel 8 at least approximately around the longitudinal axis 9 of the frame. The fan like spreading of the guide plates 6 is seen most clearly in FIG. 4. There, the two sets of plates 4, 5 are shown drawn apart upward and downward, so that the fan like spread becomes apparent.

The guide plates 6 of each set of plates 4 and 5 may be pivoted separately around a common plate pivot axis 10, 11 extending transversely to the guide plates 6 near the inlet of the board guide channel 8. This makes it possible to vary the twist of the board guide channel 8. The magnitude of the twist is always chosen so that the twist present following the production of the boards 1 is completely eliminated and straight boards are obtained. The twist initially present depends on the manufacturing conditions and the properties of the wood, in particular its humidity and temperature.

The guide plates 6 are adjusted by means of a pivot drive, wherein a separate pivot drive is provided for each of the two sets of plates, said pivot drive being designed so that different pivoting of the individual guide plates is possible.

Figure 2:
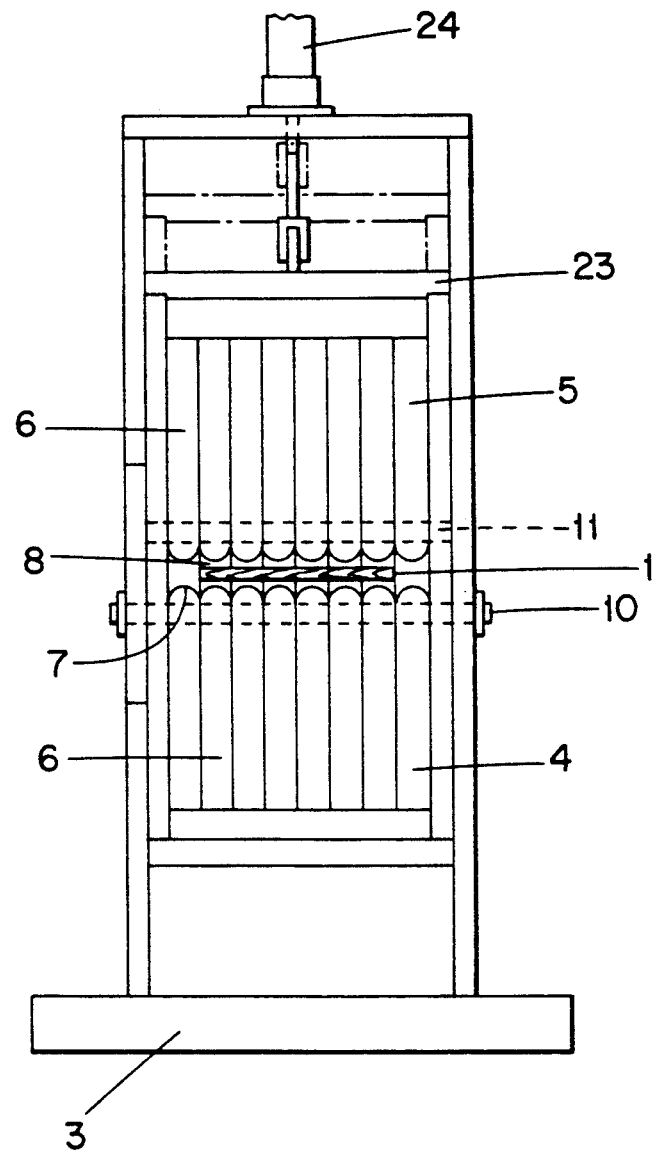

In the example of embodiment shown this pivot drive comprises for each set of plates 4, 5 an adjusting rod 12, 13 extending through bore holes 14 and 14a transversely to the guide plates 6 of the sets 4, 5. A common variable motor 15 (FIG. 3) drives angular gears 16, 16' located on either side of the frame 3, with one threaded spindle 17, 17' extending upward from each of the angular drives 16, 16'. The two threaded spindles 17, 17' engage by means of an articulation 18, 18' the two ends of the of the lower adjusting rod 12 projecting laterally from the frame 3. Upon the actuation of the variable motor 15 the threaded spindles 17, 17' are driven in opposing directions so that one articulation 18' is moved upwards and the other articulation 18 downward. In the process the adjusting rod 12 executes a tilting motion around a tilt axle 19 extending parallel to the longitudinal axis 9 of the frame. As seen in FIG. 1, the two adjusting rods 12, 13 are located near the outlet end of the board guide channel 8.

Each of the articulations 18, 18' is connected by means of vertical, lateral connecting rods 20, 20' flexibly with an articulation 21, 21' located above it, and the two ends of the upper adjusting rod 13. Consequently, the upper adjusting rod 13 is also tilted in the aforedescribed adjusting motion around a tilt axle 22 extending parallel to the longitudinal axis 9 of the frame, while remaining parallel to the lower adjusting rod 12.

Figure 3:
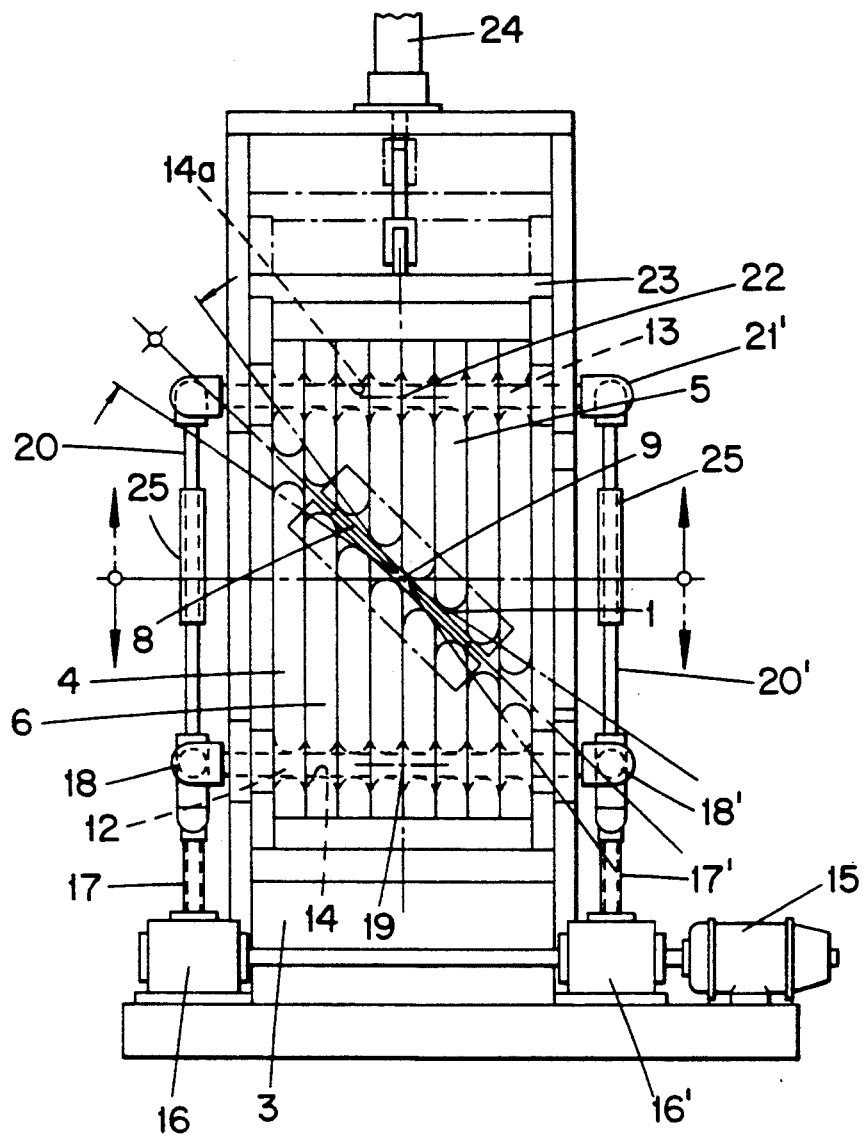
Figure 4:
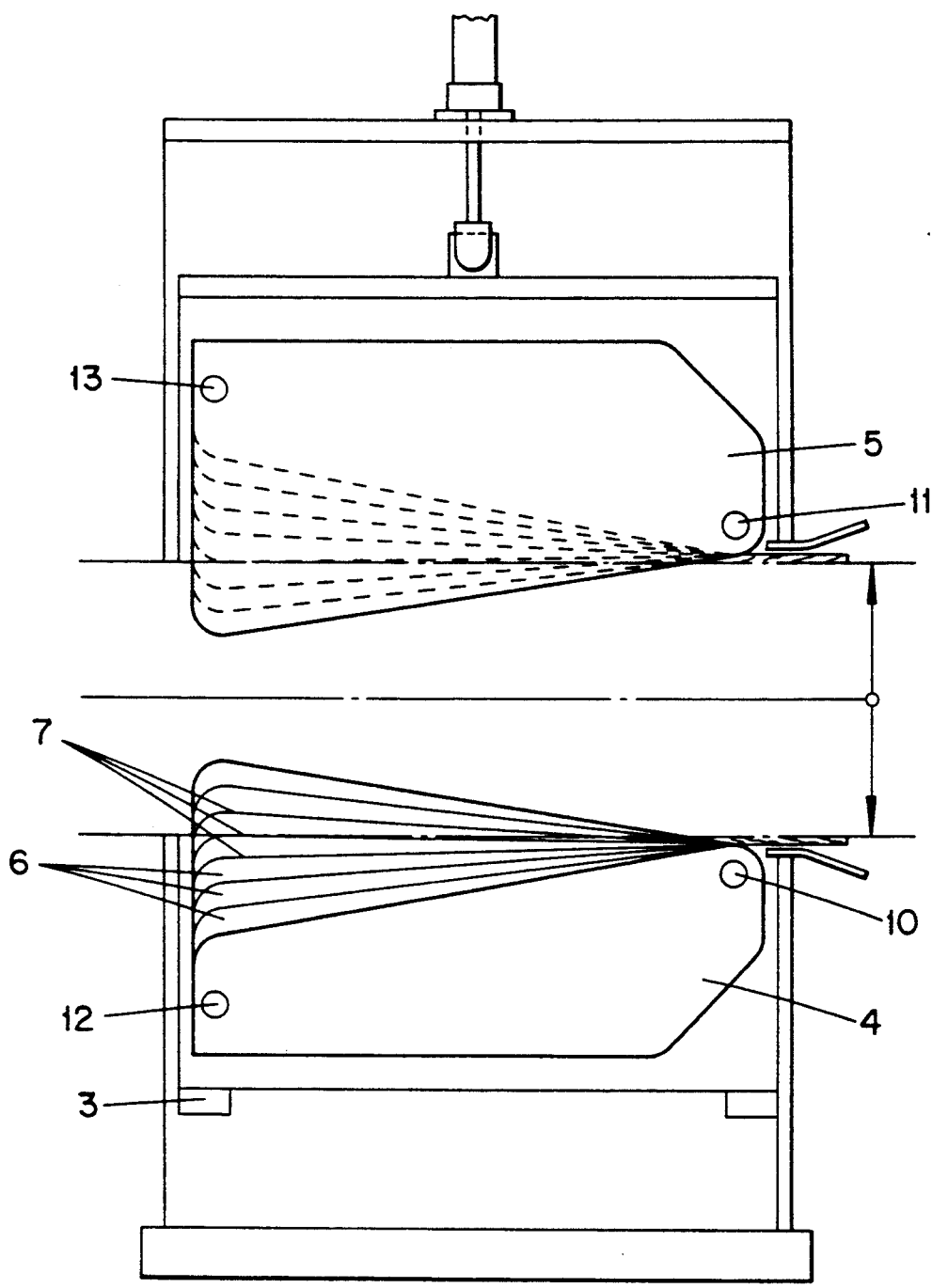
FIG. 4 shows in a lateral elevation similar to FIG. 1 a view drawn apart in the upward and downward direction of the two sets of plates, wherein the fan like spread may be seen, and FIG. 5 a front elevation similar to FIG. 3, but in the opened state.

This adjusting motion alters—as indicated in FIG. 3—the oblique setting of the board guide channel 8 at the outlet end. It is obvious that the process described in the example of embodiment using threaded spindles 17 driven in opposing directions and the tilting drive formed by the connecting rods 20, 20', could be carried out in other ways, for example with synchronously controlled individual drives engaging the adjusting drives 12, 13 or the individual guide plates 6.

Figure 5:
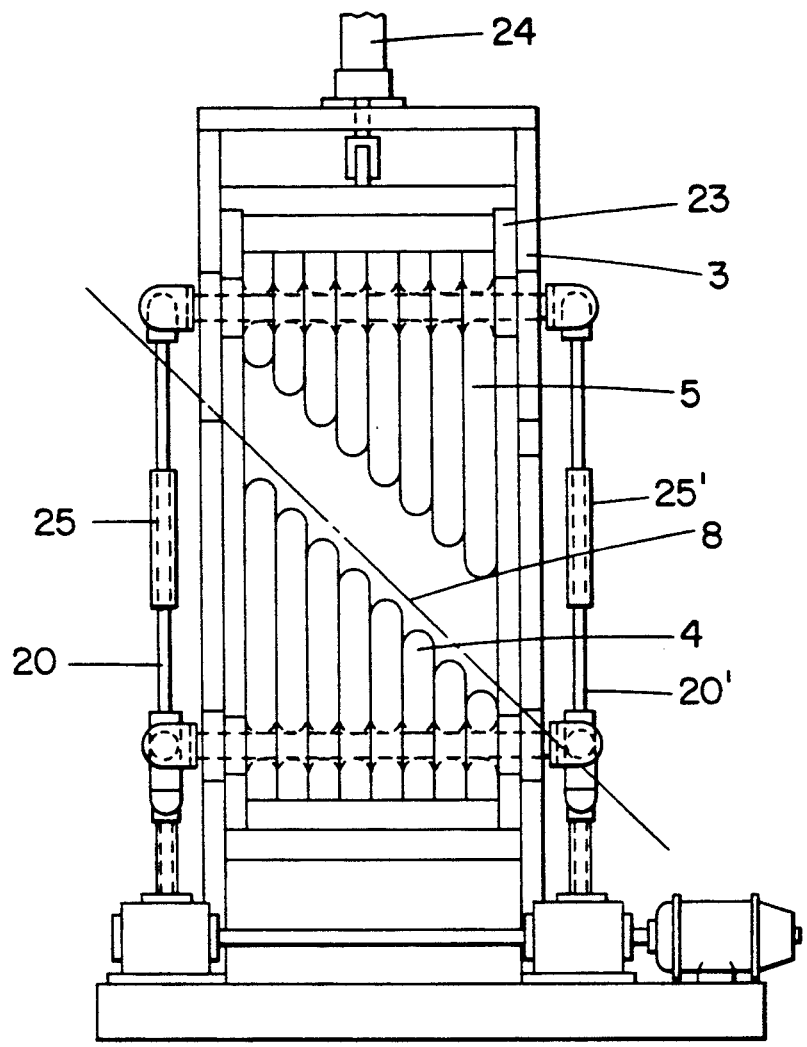

While the lower set of plates 4 is supported directly in the frame 3, the upper set 5 is mounted in a support strand 23, that may be raised by means of an opening drive, in the example shown by a lifting cylinder 24, in order to open the board guide channel 8. This opened state is shown in FIG. 5. It is desirable to be able to open the board guide channel 8 for the removal of wood rests, which may result from the breakage of boards 1 in the board guide channel 8.

To make possible the lifting of the upper set of plates 5, the connecting rods 20, 20' are divided so that each has a rod lock 25, 25' that may be opened in order to extend the connecting rods 20, 20' in the manner of a telescope, if the upper set of plates 5 is raised as described above.

As indicated in FIG. 1, the outlet end of the frame 3 is followed by a pair of rollers 26 with at least one driven roller, to move the boards 1 out of the frame 3. The boards 1 may be introduced either by feeder rollers (not shown) or by the advance movement during the production of the boards.

In the example of embodiment shown the board guide channel 8 has a twist even in the initial position, i.e. the board guide channel 8, which is horizontal at the inlet (FIG. 2), is inclined at the outlet (FIG. 3). It is possible, on the other hand, to set the board guide channel 8 in the initial position without a twist and then adjust it by varying the guide plates 6 to different degrees.

The adjusting range of the guide plates 6 may be chosen significantly larger than indicated in FIG. 3. For particularly large adjusting ranges, it is appropriate to provide a separate pivot drive for each guide plate.

I claim:

1. Apparatus for straightening twisted boards, comprising:
    a set of first plates and a set of second plates, said sets forming therebetween a substantially narrow board-guiding channel having a board inlet and a board outlet, said channel defining a longitudinal axis, said first plates being arranged adjacent one another such that first planes defined by said first plates are substantially parallel, said first plates being pivotable about a common first pivot axis situated adjacent said board inlet, said first pivot axis extending transversely of said first planes, said second plates arranged adjacent one another such that second planes defined by said second plates are substantially parallel to one another and to said first planes, said second plates being pivotable about a common second axis oriented substantially parallel to said first pivot axis adjacent said board inlet, said channel being defined between opposing edges of said first and second plates, and pivot drive means for effecting relative pivoting of said first plates about said first pivot axis, and for effecting relative pivoting of said second plates about said second pivot axis, to provide said channel with a twisted configuration along its longitudinal length.

2. Apparatus according to claim 1, wherein said pivot drive means includes a single drive motor operably connected to all of said first and second plates.

3. Apparatus according to claim 1, wherein said pivot drive means includes means for pivoting some of said first plates by relatively different amounts in one direction of pivoting, and for pivoting others of said first plates by relatively different amounts in an opposite direction of pivoting; and further including means for pivoting some of said second plates by relatively different amounts in said one direction of pivoting, and for pivoting others of said second plates by relatively different amounts in said other direction.

4. Apparatus according to claim 1, wherein said pivot drive means includes a first adjusting rod extending through said first plates at a location spaced from said first pivot axis, and a second adjusting rod extending through said second plates at a location spaced from said second pivot axis, and further including tilting means for tilting said first and second rods about respective axes oriented parallel to said longitudinal axis.

5. Apparatus according to claim 4, wherein said tilting means comprises first tilting means for tilting opposite ends of said first adjusting rod in mutually opposite directions, and second tilting means operating synchronously with said first tilting means for tilting opposite ends of said second tilting means in mutually opposite directions, so that the tilting of said channel occurs about said longitudinal axis.

6. Apparatus according to claim 5, wherein said first and second tilting means are arranged to maintain said first and second adjusting rods in mutually parallel relationship.

7. Apparatus according to claim 6, wherein said first and second adjusting rods are situated adjacent said board outlet.

8. Apparatus according to claim 1, wherein said first plates are mounted on a first frame, and said second plates are mounted on a second frame, one of said frames being movable away from the other frame for opening said channel.

9. Apparatus according to claim 8, wherein said first plates are disposed above said second plates, said first frame being raisable relative to said second frame for opening said channel.

10. Apparatus according to claim 8, wherein said first edges of said first and second plates are rounded as viewed along said longitudinal axis.

11. Apparatus according to claim 1, wherein said first and second pivot axes are fixed so that said board inlet remains fixed during pivoting of said first and second plates.

* * * * *